United States Patent
Lho et al.

(10) Patent No.: US 11,398,623 B2
(45) Date of Patent: Jul. 26, 2022

(54) METHOD FOR PREPARING POSITIVE ELECTRODE ADDITIVES OF LITHIUM SECONDARY BATTERY

(71) Applicant: LG Chem, Ltd., Seoul (KR)

(72) Inventors: Eunsol Lho, Daejeon (KR); Hyelim Jeon, Daejeon (KR); Donghun Lee, Daejeon (KR); Sang Wook Lee, Daejeon (KR); Wang Mo Jung, Daejeon (KR); Minsuk Kang, Daejeon (KR); Sora Baek, Daejeon (KR)

(73) Assignee: LG Energy Solution, Ltd.

( * ) Notice: Subject to any disclaimer, the term of this patent is extended or adjusted under 35 U.S.C. 154(b) by 316 days.

(21) Appl. No.: 16/615,519

(22) PCT Filed: Nov. 21, 2018

(86) PCT No.: PCT/KR2018/014368
§ 371 (c)(1),
(2) Date: Nov. 21, 2019

(87) PCT Pub. No.: WO2019/103459
PCT Pub. Date: May 31, 2019

(65) Prior Publication Data
US 2020/0176754 A1    Jun. 4, 2020

(30) Foreign Application Priority Data
Nov. 22, 2017  (KR) .................. 10-2017-0156744
Nov. 20, 2018  (KR) .................. 10-2018-0143870

(51) Int. Cl.
*H01M 4/1391* (2010.01)
*H01M 4/02* (2006.01)
*H01M 4/04* (2006.01)
*H01M 10/0525* (2010.01)

(52) U.S. Cl.
CPC ....... *H01M 4/1391* (2013.01); *H01M 4/0471* (2013.01); *H01M 10/0525* (2013.01); *H01M 2004/028* (2013.01)

(58) Field of Classification Search
CPC ............ H01M 4/1391; H01M 4/0471; H01M 10/0525; H01M 2004/028; H01M 4/00; H01M 4/131; H01M 4/485; H01M 4/525; H01M 4/5825; H01M 10/052; C01P 2002/72; C01P 2002/74; C01P 2002/88; C01P 2002/54; C01P 2006/40; Y02E 60/10; C01G 53/42
See application file for complete search history.

(56) References Cited

U.S. PATENT DOCUMENTS

| | | | |
|---|---|---|---|
| 5,955,219 A | 9/1999 | Nishijima et al. | |
| 7,282,300 B2 | 10/2007 | Goh et al. | |
| 7,410,511 B2 | 8/2008 | Ozaki et al. | |
| 7,695,867 B2 | 4/2010 | Chang et al. | |
| 8,835,055 B2 | 9/2014 | Chang et al. | |
| 9,023,525 B2 | 5/2015 | Chang et al. | |
| 9,236,610 B2 | 1/2016 | Chang et al. | |
| 2010/0209771 A1* | 8/2010 | Shizuka ............... | H01M 4/505 429/207 |
| 2012/0021284 A1 | 1/2012 | Lee et al. | |
| 2012/0148920 A1 | 6/2012 | Song et al. | |
| 2014/0306150 A1 | 10/2014 | Kim et al. | |
| 2015/0340692 A1 | 11/2015 | Park et al. | |
| 2015/0372300 A1 | 12/2015 | Imaizumi et al. | |

FOREIGN PATENT DOCUMENTS

| | | |
|---|---|---|
| CN | 102339980 A | 2/2012 |
| CN | 102790203 A | 11/2012 |
| CN | 104103826 A | 10/2014 |
| CN | 104781961 A | 7/2015 |
| EP | 0845436 A1 | 6/1998 |
| JP | H10158017 A | 6/1998 |
| JP | 2004284845 A | 10/2004 |
| JP | 4043000 B2 | 2/2008 |
| JP | 4767484 B2 | 9/2011 |
| KR | 20030076153 A | 9/2003 |
| KR | 20060008568 A | 1/2006 |
| KR | 20070033839 A | 3/2007 |
| KR | 20070052512 A | 5/2007 |
| KR | 101595322 B1 | 2/2016 |
| KR | 20170065982 A | 6/2017 |
| KR | 101770483 B1 | 8/2017 |
| KR | 20170096673 A | 8/2017 |

OTHER PUBLICATIONS

Extended European Search Report including Written Opinion for Application No. EP18881260.6 dated Apr. 2, 2020, 8 pages.
Love et al., "Characterization and Electrochemical Properties of Li2Cu0.5Ni0.4M0.1O2 Lithium-ion Battery Cathodes", ECS Transactions, Jan. 1, 2009, vol. 16, No. 29, pp. 27-35, XP55679508.
Ruther et al., "Synthesis, Structure, and Electrochemical Performance of High Capacity Li2Cu0.5Ni0.5O2 Cathodes", Chemisty of Materials, vol. 27, No. 19, Sep. 16, 2015, p. 6746-6754, XP55679520.
Setiawati et al., "Structural Changes and Electrochemical Properties of Li2Cu1—xMxO2 for Lithium Secondary Batteries", Solid State Ionics, Elsevier, Available online Dec. 4, 2013, vol. 262, pp. 115-119, XP28855896.
International Search Report for Application No. PCT/KR2018/014368 dated May 21, 2019.
Chinese Search Report for Application No. 201880028288, dated Jul. 26, 2021, 3 pages.

* cited by examiner

*Primary Examiner* — Muhammad S Siddiquee
(74) *Attorney, Agent, or Firm* — Lerner, David, Littenberg, Krumholz & Mentlik, LLP

(57) ABSTRACT

The present disclosure provides a preparing method of a positive electrode additive for a lithium secondary battery capable of reducing the amount of Li-based byproduct and unreacted lithium oxide generated in a preparing process, thereby significantly reducing the amount of gas generated when the electrode is operated.

13 Claims, 3 Drawing Sheets

METHOD FOR PREPARING POSITIVE ELECTRODE ADDITIVES OF LITHIUM SECONDARY BATTERY

CROSS-REFERENCE TO RELATED APPLICATIONS

The present application is a national phase entry under 35 U.S.C. § 371 of International Application No. PCT/KR2018/014368 filed Nov. 21, 2018, the disclosure of which is incorporated herein in its entirety by reference, which claims priority to and the benefit of Korean Patent Application No. 10-2017-0156744 filed in the Korean Intellectual Property Office on Nov. 22, 2017, and Korean Patent Application No. 10-2018-0143870 filed in the Korean Intellectual Property Office on Nov. 20, 2018, the entire contents of which are incorporated herein by reference.

TECHNICAL FIELD

The present disclosure generally relates to a method for preparing a positive electrode additive of a lithium secondary battery that is capable of reducing by-products and unreacted materials produced in a preparing process, with the aim of significantly reducing the amount of gas generated when the electrode is operated.

BACKGROUND

As technology development and demand for mobile devices increase, demand for secondary batteries as energy sources has been rapidly increasing. Among these secondary batteries, a lithium secondary battery having high energy density and a high voltage, a long life cycle, and a low self-discharge rate is commercially available and widely used.

Graphite is mainly used as a negative electrode material of the lithium secondary battery, but it is difficult to increase capacity of the lithium secondary battery because capacity per unit mass of graphite is as small as 372 mAh/g. Accordingly, as non-carbon materials of the negative electrode having higher capacity than graphite, materials for forming a lithium-metal compound with lithium, such as silicon, tin, and oxides thereof have been developed and used, but these materials of the negative electrode have high irreversible capacity loss because they have low initial efficiency during initial charge/discharge.

To overcome this, a method for compensating the irreversible capacity loss of the negative electrode by using a material that can provide a positive electrode material with a lithium ion source or storage, and become electrochemically active after an initial cycle so as to not deteriorate performance of the entire battery, has been studied and proposed. Specifically, there is a method of using, as a sacrificial positive electrode material or an irreversible additive (or overdischarge inhibitor), a lithium nickel-based oxide including an excess amount of lithium, such as $Li_2NiO_2$, in the positive electrode.

However, the lithium nickel-based oxide is mainly produced by reacting a nickel oxide or nickel carbonate with an excess amount of a lithium oxide, and in this case, the unreacted lithium oxide ($Li_2O$), or by-products such as LiOH or $Li_2CO_3$, remain in the finally produced lithium nickel-based oxide. The unreacted lithium oxide and the by-products remaining in the lithium nickel-based oxide are decomposed during the initial cycle of the battery, and generate an excessive amount of gas such as $O_2$ and $CO_2$.

When a composition for preparing the electrode is prepared, the by-products such as LiOH reacts with a binder component of the electrode to increase viscosity of the composition or cause gelation, thereby making it difficult to uniformly apply the composition of the electrode for forming the active material layer, and deteriorating characteristics of the battery. Further, free Li derived from free LiOH, and/or LiOH, deteriorates cycle efficiency of the positive electrode.

DISCLOSURE

Summary

In one embodiment, the present disclosure provides a method for preparing a positive electrode additive of a lithium secondary battery that is capable of reducing the amount of Li-based by-products and unreacted lithium oxides, thereby drastically reducing the amount of gas generated when an electrode is operated.

In a further embodiment, the present disclosure provides a positive electrode additive for a lithium secondary battery that is produced according to a preparing method to significantly reduce the amount of Li-based by-products and unreacted materials which are known to cause the generation of gas, and a positive electrode for a lithium secondary battery and a lithium secondary battery that include the positive electrode additive and exhibit excellent electrochemical characteristics.

According to an exemplary embodiment of the present disclosure, a preparing method of a positive electrode additive for a lithium secondary battery is provided, including mixing a lithium raw material, a nickel raw material, and a raw material of an element M and heat treating them under an atmosphere of an inert gas to produce a lithium nickel oxide of Chemical Formula 1 below, wherein the heat treating includes first heat treating at 300° C. to 500° C., and second heat treating at 550° C. to 800° C. after the first heat treating, and the first heat treating is performed for 30% to 50% of a total duration of the heat treating, wherein the positive electrode additive includes the lithium nickel oxide of Chemical Formula 1:

$$Li_2Ni_{1-x}M_xO_2 \qquad \text{[Chemical Formula 1]}$$

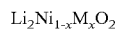

wherein, in Chemical Formula 1, M is a transition metal, an amphoteric element, P, F, or B, wherein M is not nickel, and 0<x<1.

According to another exemplary embodiment of the present disclosure, a positive electrode additive for a lithium secondary battery is provided. The positive electrode additive is prepared by a preparing method, and includes a lithium nickel oxide of Chemical Formula 1, and further includes less than 11 wt % NiO and 1 wt % or less $Li_2O$, wherein a total amount of the NiO and the $Li_2O$ is less than or equal to 11 wt % based on a total weight of the positive electrode additive.

According to another exemplary embodiment of the present disclosure, a positive electrode for a lithium secondary battery and a lithium secondary battery that includes the positive electrode additive are provided.

The preparing method of a positive electrode additive for a lithium secondary battery according to the present disclosure can reduce the by-products and the unreacted materials produced in the preparing process, thereby significantly reducing the amount of gas generated when the electrode is operated. Accordingly, the positive electrode and the lithium secondary battery manufactured using the positive electrode additive may exhibit excellent electrochemical and lifespan characteristics.

DETAILED DESCRIPTION

Figure 1:
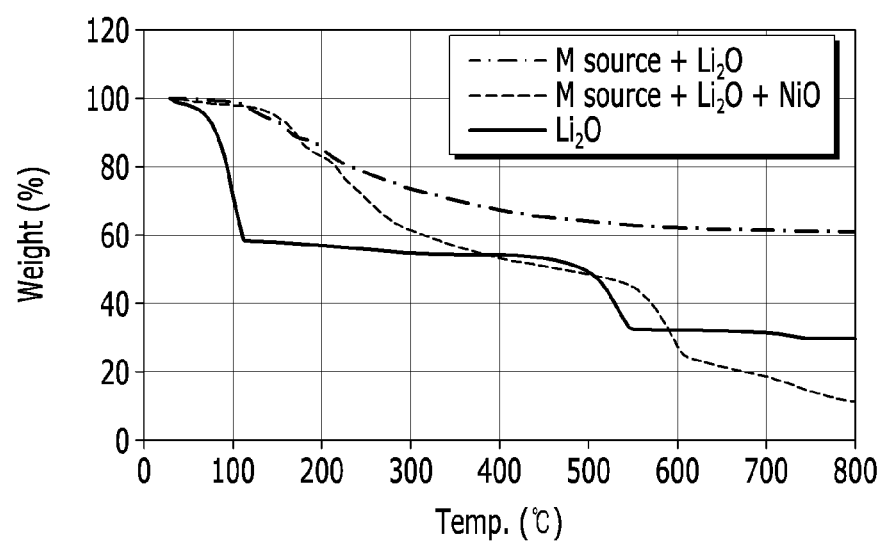
FIG. 1 is a graph showing a result of thermal analysis of a mixture for preparing a positive electrode additive in Experimental Example 1.

Hereinafter, the present disclosure will be described in detail for a better understanding of the present disclosure.

Terms and words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

A preparing method of a positive electrode additive for a lithium secondary battery according to an exemplary embodiment of the present disclosure, a positive electrode additive produced by such a method, and a positive electrode and a lithium secondary battery including such a positive electrode additive will now be described.

One embodiment of a preparing method of a positive electrode additive for a lithium secondary battery according to the exemplary embodiment of the present disclosure includes mixing a lithium raw material, a nickel raw material, and a raw material of an element M, and heat treating them under an atmosphere of an inert gas to manufacture a lithium nickel oxide of Chemical Formula 1, wherein the heat treating includes first heat treating at 300° C. to 500° C. and second heat treating at 550° C. to 800° C. after the first heat treating, and the first heat treating is performed for 30% to 50% of a total duration of the heat treating.

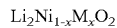  [Chemical Formula 1]

In Chemical Formula 1, M is a transition metal, an amphoteric element, P, F, or B, wherein M is not nickel, and 0<x<1.

As described above, in the preparing method according to the exemplary embodiment, when the additive comprising the lithium nickel oxide of the above formula 1 is prepared by using the nickel raw material, the element M raw material, and the lithium raw material, a multi-step heat treatment is performed at the reaction temperatures confirmed by thermal analysis of the raw materials and mixtures thereof, so as to induce a sufficient reaction of the lithium raw materials and to significantly reduce unreacted lithium oxides and by-products which cause gas generation during the operation of the battery Specifically, in the preparing method according to the exemplary embodiment, the heat treating includes: reacting the lithium raw material and the raw material of the element M in a mixture containing the lithium raw material, the nickel raw material, and the raw material of the element M through the first heat treating under an atmosphere of an inert gas at 300° C. to 500° C. to produce a compound containing lithium and the element M; and producing the lithium nickel oxide of Chemical Formula 1 through the second heat treating for the compound under an atmosphere of an inert gas at 550 to 800° C., and simultaneously reacting the remaining lithium and nickel raw materials that are not reacted in the heat treating.

Specifically, the first heat treating is performed at 300° C. to 500° C. When the first heat treating is performed within the temperature range, the reaction between the lithium raw material and the raw material of the element M sufficiently occurs, and the compound containing lithium and the element M can be produced with a high yield. However, if the temperature is below 300° C. during the first heat treating, the reaction between the lithium raw material and the raw material of the element M does not sufficiently occur, and as a result, a large amount of unreacted raw materials is produced, thereby generating by-products in the subsequent second heat treating. If the temperature exceeds 500° C., it is not easy to control a reaction rate of the lithium raw material and the raw material of the element M, thereby generating by-products. In addition, if the temperature exceeds 500° C., because $Li_2O$ and NiO and the M raw material react simultaneously, there is no effect of controlling the unreacted $Li_2O$ in the first heat treating. When considering that the generation of unreacted materials and by-products are prevented by controlling the temperature in the first heat treating and that the compound containing lithium and the element M is well produced, the first heat treating may be performed at 330° C. to 450° C., and more specifically may be performed at 350° C. to 400° C.

The first heat treating may be performed for 30% to 50% of a total duration of the overall heat treating. When the first heat treating is performed for the above-described duration, the reaction between the lithium raw material and the raw material of the element M may sufficiently occur. However, if the duration of the first heat treating is less than 30% of the total duration of the heat treating, the reaction between the lithium raw material and the raw material of the element M does not sufficiently occur, and as a result, a large amount of the unreacted raw materials is produced, thereby producing by-products in the subsequent second heat treating. When the duration of the first heat treating exceeds 50% of the total duration of the heat treating, a duration of the second heat treating relatively decreases, and an amount of the unreacted lithium oxide may increase because there is not sufficient time for the unreacted lithium raw material and the nickel raw material to react during the second heat treating. When considering that the generation of unreacted materials and by-products are prevented by controlling the temperature in the first heat treating and that the compound containing lithium and the element M is well produced, the first heat treating may be performed for 35% to 45% of the total duration of the heat treating, and more specifically, for 40% to 45% of the total duration of the heat treating.

The first heat treating may also include a temperature rising step of heating the mixture of the reaction materials to the above-described heat treating temperature, and a maintaining step of maintaining the heated temperature for a predetermined time such that the reaction sufficiently occurs.

The temperature rising step in the first heat treating may be specifically performed by heating to a temperature of 300° C. to 500° C. at a rate of 2° C./min to 7° C./min, and more specifically, at a rate of 2° C./min to 5° C./min. When the temperature rising step is performed at the controlled heating rate as described above, efficiency of the reaction can be further improved.

The maintaining step may be performed for 40% to 80% of the total duration of the first heat treating. When the maintaining step is performed for the above-described duration, a diffusion reaction between particles can sufficiently occur, and the reaction between the raw material of the element M and the lithium raw material can be further improved. When considering that further improvement is made by controlling the duration of the maintaining, the maintaining step may be performed for 40% to 70% of the total duration of the first heat treating.

The first heat treating, specifically, the first heat treating including the temperature rising step and the maintaining step, may be performed under an atmosphere of an inert gas such as nitrogen, helium, or argon to suppress the side reaction. Among them, when considering that efficiency of the reaction increases and the side reaction is suppressed, the first heat treating may be performed under an atmosphere of nitrogen.

In the first heat treating, the lithium raw material such as an oxide, a sulfate, a nitrate, an acetate, a carbonate, an oxalate, a citrate, a halide, a hydroxide, or an oxyhydroxide that contain lithium may be used, and specifically, for example, $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$ may be used. One or a mixture of two or more of them may be used. Among them, when considering that when reacted with a nickel-containing precursor material, efficiency of the reaction is improved and that the side reaction materials are reduced, the lithium raw material may be $Li_2O$.

The nickel raw material may be a nickel-containing oxide or hydroxide such as a nickel oxide (NiO) or a nickel hydroxide ($Ni(OH)_2$).

Examples of the raw material of the element M may be an oxide, a sulfate, a nitrate, an acetate, a carbonate, an oxalate, a citrate, a halide, a hydroxide, an oxyhydroxide, or a phosphate containing M, and among them, may be a phosphate. In this case, the M is contained in a finally produced lithium nickel-containing oxide by substituting some of nickel with M, which may serve to improve thermal stability and structural stability, and specifically, may be, for example: a transition metal element having a divalent, trivalent, or pentavalent oxidation number such as Co, Mn, W, Fe, Mg, Ti, Cu, or Zr; an amphoteric element having a trivalent oxidation number such as Al; and one selected from the group consisting of P, F, and B. Among them, the M may be selected from the group consisting of W, Ti, Al, Zr, P, F, and B, and more specifically, may be W, Al, P, or B, which is excellent in reactivity with lithium and makes it possible to produce a more stable compound, and specifically, among them, may be W, Al, or P.

The lithium raw material, the nickel raw material, and the raw material of the element M may be respectively used in amounts such that they satisfy a composition ratio of metal elements such as lithium and nickel in the finally produced lithium nickel oxide represented by Chemical Formula 1. Specifically, the lithium raw material may be used in the amount such that a mole ratio of lithium:(nickel+element M) is 2:1. When the mole ratio of lithium:(nickel+element M) does not satisfy 2:1, the composition of Chemical Formula 1 is not satisfied, and as a result, it cannot fully function as a sacrificial positive electrode material or a non-reversible additive.

When mixing the raw materials, a sintering agent may be further optionally added. Specifically, the sintering agent may be: an ammonium ion-containing compound such as $NH_4F$, $NH_4NO_3$, or $(NH_4)_2SO_4$; a metal oxide such as $B_2O_3$ or $Bi_2O_3$; or a metal halide such as $NiCl_2$ or $CaCl_2$, and any one or a mixture of two or more of them may be used. The sintering agent may be used in an amount of 0.01 mol to 0.2 mol based on 1 mol of the raw material containing nickel. When used within the above-mentioned content range, since the sintering property is greatly improved, performance of the positive electrode additive is improved and initial capacity of the battery is prevented from being deteriorated when the battery is charged/discharged.

In addition, when mixing the raw materials, a moisture-removing agent may be further optionally added. Specifically, examples of the moisture-removing agent may include citric acid, tartaric acid, glycolic acid, and maleic acid, and any one or a mixture of two or more of them may be used. The moisture-removing agent may be used in an amount of 0.01 mol to 0.2 mol based on 1 mol of the nickel raw material.

After the first heat treating of the mixture including the lithium raw material, the nickel raw material, and the raw material of the element M, the lithium-element M-containing compound is produced by the reaction between the lithium raw material and the raw material of the element M. Specifically, the lithium-element M-containing compound may be a compound having a Li-M-O phase such as $Li_3PO_4$, $Li_5AlO_4$, or $LiBO_2$ (the M is the same as described above). In this case, together with the lithium-element M-containing compound, the unreacted lithium raw material such as $Li_2O$ and the nickel raw material are present in reaction products.

Next, continuing with the above exemplary embodiment of the method, the second heat treating is specifically performed at 550 to 800° C. When the second heat treating is performed within the temperature range described above, without worrying about a decrease in discharge capacity per unit weight, deterioration of cycle characteristics, and decrease of the operating voltage due to presence of the unreacted raw materials, occurrence of the side reaction, or a decomposition reaction of the reaction materials, the lithium nickel-containing oxide of Chemical Formula 1 can be prepared with excellent efficiency, and the amount of the unreacted lithium oxide can be reduced by the reaction between the unreacted lithium oxide and the nickel raw material at the same time. More specifically, when considering the superior effect of controlling the heating temperature, the second heat treating may be performed at 600° C. to 800° C., and more specifically, at 600° C. to 700° C.

The second heat treating may be performed for 50 to 70% of the total duration of the heat treating. When the duration of the second heat treating is less than 50% of the total duration of the heat treating, a sufficient reaction between the unreacted lithium oxide and the nickel raw material hardly occurs because the duration of the reaction is short, and an amount of lithium-based byproduct in the positive electrode additive may be hardly reduced due to poor efficiency of the reaction. When the duration of the second heat treating exceeds 70%, an excessive reaction is likely to occur, and this is inefficient because the heat treating is excessively long. Specifically, the second heat treating may be performed for 50% to 65% of the total duration of the heat treatment, and more specifically, for 50% to 60%.

The second heat treating may include: a temperature rising step of heating the mixture of the lithium-element M-containing compound, the nickel raw material, the unreacted lithium raw material that is manufactured in the previous step; and a maintaining step of maintaining the heated temperature for a predetermined time such that the reaction sufficiently occurs.

Specifically, the temperature rising step in the second heat treating may be performed by heating to a temperature of 550° C. to 800° C., more specifically at 600° C. to 800° C., and even more specifically at 600° C. to 700° C., at a rate of 2 to 7° C./min, and more specifically at a rate of 2 to 5° C./min. When the temperature rising step is performed at a controlled heating rate as described above, efficiency of the reaction can be further improved.

The maintaining step may be performed for 60% to 90% of the total duration of the second heat treating. When the maintaining step is performed for the above-described duration, a diffusion reaction between particles can sufficiently occur, and the reaction between the raw material of the element M and the lithium raw material can be improved. When considering the superior effect of controlling the duration of the maintaining, the maintaining step may be performed for 60 to 80% of the total duration of the second heat treating.

The second heat treating, specifically, the second heat treating including the temperature rising step and the maintaining step, may also be performed under an atmosphere of an inert gas such as nitrogen, helium, or argon so as to suppress the side reaction. Among them, when considering that efficiency of the reaction increases and the side reaction is suppressed, the second heat treating may be performed under an atmosphere of nitrogen.

Cooling may be optionally further performed after the second heat treating.

The cooling may be performed according to a conventional method, and specifically, may be performed by methods such as natural cooling and hot air cooling under an air atmosphere.

A Li-M-O phase included in a reaction product obtained from the first heat treating as described above reacts with the remaining unreacted $Li_2O$ and NiO, thereby producing a positive electrode additive including a lithium nickel oxide doped with M, such as for example Chemical Formula 1.

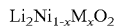   [Chemical Formula 1]

In Chemical Formula 1, M is a transition metal, an amphoteric element, P, F, or B, wherein M is not nickel, and 0<x<1.

Specifically, continuing with this example, the element M may be one selected from the group consisting of: a transition metal element having a divalent, trivalent, or pentavalent oxidation number such as Co, Mn, W, Fe, Mg, Ti, Cu, or Zr; an amphoteric element having a trivalent oxidation number such as Al; and P, F, and B, and among them, the M may be one selected from the group consisting of W, Ti, Zr, Al, P, F, and B, and more specifically, may be P, Al, or B, which is excellent in reactivity with lithium and capable of forming a more stable compound.

The element M may be contained in an amount corresponding to x by substituting Ni. Specifically, the amount of the substituted element M may be 0≤x<0.5 or 0.01≤x≤0.1 when considering an improved effect of controlling the amount of the substituted M contained in the lithium nickel oxide, and more specifically, 0.01≤x≤0.06.

As the remaining unreacted $Li_2O$ reacts with NiO during the second heat treating, the amount of the remaining unreacted $Li_2O$ and the amount of NiO in the produced positive electrode additive significantly decrease when compared with the prior art, and particularly the amount of the lithium-based byproduct such as $Li_2O$ significantly decreases.

Specifically, the positive electrode additive produced according to the preparing method includes the lithium nickel oxide of Chemical Formula 1, and further includes less than 11 wt % NiO and 1 wt % or less $Li_2O$ based on a total weight of the positive electrode additive, wherein a total amount of NiO and $Li_2O$ may be less than or equal to 11 wt % based on a total weight of the positive electrode additive.

More specifically, the positive electrode additive may include $Li_2O$ at 0.5 wt % or less, and more specifically, 0 wt % of $Li_2O$, that is, it does not include $Li_2O$. As the amount of the unreacted material and the lithium byproduct decreases, an amount of gas generated when the battery is operated can be significantly reduced.

When the positive electrode additive is charged at 0.1 C to 3.8 V at 25° C. and is then analyzed using X-ray diffraction, d1/d2=0 if intensity of a $Li_2O$ peak appearing at 2θ=30° to 35° is d1 and intensity of a $LiNiO_2$ peak appearing at 2θ=15° to 20° is d2.

In the present disclosure, X-ray diffraction analysis of the positive electrode additive can be performed according to a conventional XRD analysis method using an X-ray diffraction analyzer, and specifically, the XRD analysis has been carried out by D4-Endeavor™ (made by Bruker AXS GmbH) using Cu-Kα radiation (2θ=15° to 35°, scanning speed=4°/min).

The positive electrode additive produced according to the preparing method, as a lithium-based byproduct, may further include LiOH of 5 wt % or less, specifically LiOH of 4.5 wt % or less, and more specifically, LiOH of 4.2 wt % or less, and $Li_2CO_3$ of 0.5 wt % to 1 wt %. The lithium-based byproduct including LiOH and $Li_2CO_3$ may be contained in an amount of 0.5 wt % to 3.5 wt %, and more specifically, 0.5 wt % to 3.1 wt %, based on the total weight of the positive electrode additive. Because the amount of LiOH is significantly reduced, gelation may not occur during the mixing for forming the positive electrode. Accordingly, the positive electrode additive can exhibit a superior effect when used as a sacrificial positive electrode material or an irreversible additive for a lithium-transition metal oxide capable of intercalating and deintercalating lithium ions. Further, since $Li_2CO_3$ is present on a surface of the positive electrode additive, it can suppress heat from being generated from the positive electrode when a short circuit occurs, and suppress moisture adsorption from the atmosphere.

Such positive electrode additives produced according to the preparing method for a lithium secondary battery as described above may reduce by-products and unreacted materials that are inevitably produced in the preparing process, thereby significantly reducing the amount of gas generated when the battery is operated. Accordingly, the positive electrode and the lithium secondary battery manufactured using the positive electrode additive may exhibit excellent electrochemical and lifespan characteristics.

Because the positive electrode additive contains an excess amount of lithium, it may be used as a sacrificial positive electrode material or an irreversible additive (or an overdischarge inhibitor) that can compensate for an irreversible capacity loss.

According to another exemplary embodiment, a positive electrode for a lithium secondary battery and a lithium secondary battery including the positive electrode additive produced by the preparing method are provided.

Specifically, the positive electrode includes a positive electrode current collector, and a positive electrode active material layer that is formed on the positive electrode current collector and includes the positive electrode additive.

The positive electrode current collector is not specifically limited as long as it has conductivity without causing chemical changes to a battery, and stainless steel, aluminum, nickel, titanium, sintered carbon, or aluminum or stainless steel surface-treated with carbon, nickel, titanium, or silver may be used as the positive electrode current collector, for example. The positive electrode current collector may have a thickness of 3 µm to 500 µm, and minute protrusions and depressions may be formed on a surface of the current collector to increase adhesiveness of the positive electrode active material. For example, the positive electrode current collector may have various forms such as a film, a sheet, a foil, a net, a porous body, foam, and a non-woven fabric.

In addition to the positive electrode additive, the positive electrode active material layer may include a positive electrode active material, a conductive material, and a binder.

In this case, the conductive material is used to provide conductivity to the electrode, and is not specifically limited as long as it has electron conductivity without causing any chemical changes to the battery. Specific examples of the conductive material include: carbon-based materials such as carbon black, acetylene black, Ketjen black, channel black, furnace black, lamp black, summer black, and carbon fiber; graphite such as natural graphite or artificial graphite; a metal powder or a metal fiber such as copper, nickel, aluminum, and silver; conductive whiskers such as zinc oxide and potassium titanate; a conductive metal oxide such as a titanium oxide; and a conductive polymer such as polyphenylene derivatives. These may be used alone or in a mixture of two or more. The conductive material may be included in an amount of 1 wt % to 30 wt % based on the total weight of the positive electrode active material layer.

In addition, the binder facilitates adhesion between particles of the positive electrode active material and adhesion between the positive electrode active material and the current collector. Specific examples of the binder may include polyvinylidene fluoride (PVdF), a vinylidene fluoride-hexafluoropropylene copolymer (PVdF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated-EPDM, styrene butadiene rubber (SBR), fluoro rubber, and various copolymers thereof. One or a mixture of two or more of them may be used as the binder. The binder may be included in an amount of 1 wt % to 30 wt % based on a total weight of the positive electrode active material layer.

When the positive electrode additive is included in the active material layer as a sacrificial positive electrode material or an irreversible additive, the positive electrode active material layer may include, as a positive electrode active material, a lithium transition metal oxide capable of intercalating and deintercalating lithium ions.

Specifically, examples of the lithium transition metal compound may be $LiCoO_2$, $LiNiO_2$, $LiMnO_2$, $LiMn_2O_2$, $Li(Ni_aCo_bMn_c)O_2$ ($0<a<1$, $0<b<1$, $0<c<1$, $a+b+c=1$), $LiNi_{1-d}Co_dO_2$, $LiCo_{1-d}Mn_dO_2$, $LiNi_{1-d}Mn_dO_2$ ($0 \leq d<1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ ($0<e<2$), $LiCoPO_4$, or $LiFePO_4$. One or a mixture of two or more of them may be used as the lithium transition metal compound. Among them, the lithium transition metal compound may be $LiCoO_2$ or $LiNiO_2$, when considering that remarkable improvement is observed when it is used in combination with the lithium nickel-based compound of Chemical Formula 1.

When the positive electrode active material layer includes a positive electrode active material, the positive electrode additive may be included in an amount of 0.1 to 10 parts by weight based on 100 parts by weight of the positive electrode active material.

The positive electrode may be manufactured by a conventional preparing method of a positive electrode, except that the positive electrode additive is used. Specifically, the positive electrode additive and optionally a composition for forming a positive electrode active material layer including a binder, a conductive material, and a positive electrode active material are applied on a positive electrode collector, and are then dried and rolled to manufacture the positive electrode. In this case, the kind and content of the positive electrode active material, the binder, and the conductive material are as described above.

The solvent may be a generally solvent in the art, and examples of the solvent include dimethyl sulfoxide (DMSO), isopropyl alcohol, N-methylpyrrolidone (NMP), acetone, and water, and one or a mixture of two or more of them may be used as the solvent. In consideration of a thickness of the slurry coating and a yield of the slurry, the positive electrode active material, the conductive material, and the binder are dissolved or dispersed, and an amount of the solvent is sufficient if it can dissolve or disperse the positive electrode active material, the conductive material, and the binder and have viscosity exhibiting excellent thickness uniformity.

Alternatively, the composition for forming a positive electrode active material layer may be casted on a separate support, and a film obtained by delamination from the support may be laminated on the positive electrode current collector, so as to manufacture the positive electrode.

According to another exemplary embodiment of the present disclosure, an electrochemical device including the positive electrode is provided. Specifically, the electrochemical device may be a battery, a capacitor, and the like, and more specifically, a lithium secondary battery.

Specifically, the lithium secondary battery includes a positive electrode, a negative electrode disposed to face the positive electrode, a separator interposed between the positive electrode and the negative electrode, and an electrolyte, and the positive electrode is as described above. The lithium secondary battery may further optionally include a battery container for accommodating an electrode assembly of the positive electrode, the negative electrode, and the separator, and a sealing member for sealing the battery container.

In the lithium secondary battery according to the exemplary embodiment of the present disclosure, the negative electrode includes a negative electrode current collector and a negative electrode active material layer disposed on the negative electrode current collector.

The negative electrode current collector is not specifically limited as long as it has high conductivity without causing any chemical changes to the battery, and copper, stainless steel, aluminum, nickel, titanium, sintered carbon, or copper or stainless steel surface-treated with carbon, nickel, titanium, or silver, and an aluminum-cadmium alloy may be used as the negative electrode current collector, for example. The negative electrode current collector may generally have a thickness of 3 µm to 500 µm, and like the positive electrode current collector, minute protrusions and depressions may be formed on a surface of the current collector to improve binding strength of the negative electrode active material. For example, the negative electrode current collector may have various forms such as a film, a sheet, a foil, a net, a porous body, foam, and a non-woven fabric.

In addition to the negative electrode active material, the negative electrode active material layer optionally includes a binder and a conductive material. As an example, the negative electrode active material layer may be prepared by applying a composition for forming a negative electrode that includes the negative electrode active material and selectively includes the binder and the conductive material on the negative electrode current collector and then drying, or by casting the composition for forming the negative electrode on a separate support body and then laminating a film obtained by separation from the support body on the negative electrode current collector.

A compound capable of reversibly intercalating and deintercalating lithium may be used as the negative electrode active material. Specific examples of the negative electrode active material include: carbon materials such as artificial graphite, natural graphite, graphitized carbon fiber, and amorphous carbon; metal substances capable of alloying with lithium such as Si, Al, Sn, Pb, Zn, Bi, In, Mg, Ga, Cd, Si alloys, Sn alloys or Al alloys; metal oxides capable of doping and dedoping lithium, such as $SiO_x$ (0<x<2), $SnO_2$, a vanadium oxide, or a lithium vanadium oxide; or complexes including the metal substances and the carbon material such as Si—C complexes or Sn—C complexes, and any one or a mixture of two or more thereof may be used. In addition, a metal lithium thin film may be used as the negative electrode active material. Further, a carbon material may use both low crystalline carbon and high crystalline carbon. The low crystalline carbon typically includes soft carbon and hard carbon, and the high crystalline carbon typically includes amorphous, platy, scaly, spherical or fiber-shaped natural graphite or artificial graphite, and high-temperature baked carbon such as Kish graphite, pyrolytic carbon, mesophase pitch based carbon fiber, meso-carbon microbeads, mesophase pitches, and petroleum or coal tar pitch derived cokes.

In addition, the binder and the conductive material may be the same as those described above with respect to the positive electrode.

Meanwhile, in the lithium secondary battery, the separator separates a negative electrode and a positive electrode, and provides an ion channel for lithium ions, and is not particularly limited as long as it is commonly used as a separator in a general lithium secondary battery. Particularly, a separator having low resistance against ion migration of an electrolyte and having excellent electrolyte moisture containing ability is preferable. Specifically, the separator may be made of a porous polymer film, for example, a porous polymer film prepared from a polyolefin-based polymer such as an ethylene homopolymer, a propylene homopolymer, an ethylene-butene copolymer, an ethylene-hexene copolymer or an ethylene-methacrylate copolymer or a laminate structure having two or more layers. Alternatively, the separator may be made of a porous nonwoven fabric, for example, a nonwoven fabric made of high-melting point glass fiber, polyethylene terephthalate fiber, and the like. In addition, in order to ensure heat resistance or mechanical strength, the separator may be a coated separator including ceramic components or polymer materials, and selectively, may be used in a single-layer or multi-layer structure.

In addition, the electrolyte used in the present disclosure may be an organic liquid electrolyte, an inorganic liquid electrolyte, a solid polymer electrolyte, a gel polymer electrolyte, an inorganic solid electrolyte, a molten-type inorganic electrolyte or the like, which may be used in the manufacture of a lithium secondary battery, but the present disclosure is not limited thereto.

Specifically, the electrolyte may include an organic solvent and a lithium salt.

Examples of the organic solvent are not specifically limited as long as they serve as a medium through which ions involved in an electrochemical reaction of the battery can move. Specifically, examples of the organic solvent may include: an ester-based solvent such as methyl acetate, ethyl acetate, γ-butyrolactone, and ε-caprolactone; an ether-based solvent such as dibutyl ether and tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethanol and isopropyl alcohol; nitriles such as R—CN (R denotes a linear, branched, or ring structured hydrocarbon group of C2 to C20, and may include a double-bonded aromatic ring or an ether bond); amides such as dimethyl formamide; dioxolanes such as 1,3-dioxolane; and sulfolanes. Among them, the carbonate-based solvent is desirable, and a mixture of a cyclic carbonate (e.g., ethylene carbonate or propylene carbonate) having high ion conductivity and a high dielectric constant which can increase charging/discharging performance of the battery, and a chain carbonate-based compound (e.g., ethylmethyl carbonate, dimethyl carbonate, or diethyl carbonate) having low viscosity is more desirable. In this case, when the cyclic carbonate and the chain carbonate are mixed in a volume ratio of about 1:1 to about 1:9, performance of the electrolytic solution may be improved.

The lithium salt is not specifically limited as long as it is a compound capable of providing lithium ions used in the lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. A concentration of the lithium salt may range from 0.1 M to 2.0 M. When the lithium salt is included at the above-described concentration range, the electrolyte may exhibit excellent performance because it has appropriate conductivity and viscosity, and lithium ions may effectively move.

In addition to the electrolyte components, for the purpose of improving lifespan characteristics of the battery, suppressing a decrease in battery capacity, improving discharge capacity of the battery and the like, the electrolyte may further include one or more additives such as a haloalkylene carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride and the like. In this case, the additives may be included at 0.1 wt % to 5 wt % based on a total weight of the electrolyte.

As described above, since the lithium secondary battery including the positive electrode additive according to the present disclosure stably exhibits excellent discharge capacity, output characteristics, and capacity retention, it can be useful in the fields of portable devices such as a mobile phone, a laptop computer, a digital camera, and the like and the electric vehicles such as a hybrid electric vehicle (HEV), and the like.

Accordingly, according to another embodiment of the present disclosure, a battery module including the lithium secondary battery as a unit cell and a battery pack including the same are provided.

The battery module or the battery pack may be used as a power source of a medium-large size device of at least one of a power tool; an electric vehicle including an electric vehicle (EV), a hybrid electric vehicle and a plug-in hybrid electric vehicle (PHEV); or a system for storing electric power.

Hereinafter, embodiments of the present disclosure will be described in detail so that those skilled in the art may easily carry out the present disclosure. However, the present disclosure may be implemented in various different forms and is not limited to the embodiments described herein.

Example 1

26.7 g of $Li_2O$ as a lithium raw material, 66.5 g of NiO as a nickel raw material, and 6.8 g of ammonium phosphate as a raw material of an element M were mixed, heated to 400° C. at a heating rate of 2° C./min for about 3 hours under an atmosphere of nitrogen and then maintained at the heated temperature for 4 hours (first heat treating), and then heated to 700° C. at a rate of 2° C./min for about 2 hours and 30 minutes under an atmosphere of nitrogen and then maintained at the heated temperature for about 6 hours (second heat treating). A resulting reactant was cooled to obtain particles of a positive electrode additive of $Li_2Ni_{0.94}P_{0.06}O_2$.

Example 2

26.7 g of $Li_2O$ as a lithium raw material, 66.5 g of NiO as a nickel raw material, and 6.8 g of aluminum phosphate as a raw material of an element M were mixed, heated to 400° C. at a heating rate of 2° C./min for about 3 hours under an atmosphere of nitrogen and then maintained at the heated temperature for 4 hours (first heat treating), and then heated to 700° C. at a rate of 2° C./min for about 2 hours and 30 minutes under an atmosphere of nitrogen and then maintained at the heated temperature for 7 hours (second heat treating). A resulting reactant was cooled to obtain particles of a positive electrode additive.

Example 3

26.7 g of $Li_2O$ as a lithium raw material, 66.5 g of NiO as a nickel raw material, and 12.4 g of $WO_3$ as a raw material of an element M were mixed, heated to 400° C. at a heating rate of 2° C./min for about 3 hours under an atmosphere of nitrogen and then maintained at the heated temperature for 4 hours (first heat treating), and then heated to 700° C. at a rate of 2° C./min for about 2 hours and 30 minutes under an atmosphere of nitrogen and then maintained at the heated temperature for about 6 hours (second heat treating). A resulting reactant was cooled to obtain particles of a positive electrode additive of $Li_2Ni_{0.94}W_{0.06}O_2$.

Comparative Example 1

26.7 g of $Li_2O$ as a lithium raw material, 66.5 g of NiO as a nickel raw material, and 6.8 g of aluminum phosphate as a raw material of an element M were mixed, heated to 700° C. at a heating rate of 2° C./min for about 5 hours and 30 minutes under an atmosphere of nitrogen, and then maintained at the heated temperature for 6 hours. No secondary heating step was used. A resulting reactant was cooled to obtain particles of a positive electrode additive.

Comparative Example 2

26.7 g of $Li_2O$ as a lithium raw material, 66.5 g of NiO as a nickel raw material, and 6.8 g of ammonium phosphate as a raw material of an element M were mixed, heated to 400° C. at a heating rate of 5° C./min for about 1 hour under an atmosphere of nitrogen and then maintained at the heated temperature for 2 hours (first heat treating), and then heated to 700° C. at a rate of 2° C./min for about 2 hours and 30 minutes under an atmosphere of nitrogen and then maintained at the heated temperature for 6 hours (second heat treating). These heating steps, particularly the first heating step, are shorter than in the various Examples above. A resulting reactant was cooled to obtain particles of a positive electrode additive.

Comparative Example 3

26.7 g of $Li_2O$ as a lithium raw material, 66.5 g of NiO as a nickel raw material, and 6.8 g of ammonium phosphate as a raw material of an element M were mixed, heated to 400° C. a heating rate of 1° C./min for about 6 hours under an atmosphere of nitrogen and then maintained at the heated temperature for 6 hours (first heat treating), and then heated to 700° C. at a rate of 2° C./min for about 2 hours and 30 minutes under an atmosphere of nitrogen and maintained at the heated temperature for 6 hours (second heat treating). The heating rate of the first heat treating is slower than the various Examples above, and thus the heating times are much longer. A resulting reactant was cooled to obtain particles of a positive electrode additive.

Comparative Example 4

26.7 g of $Li_2O$ as a lithium raw material, 66.5 g of NiO as a nickel raw material, and 6.8 g of aluminum phosphate as a raw material of an element M were mixed, heated to 400° C. at a heating rate of 2° C./min for about 3 hours under an atmosphere of oxygen and then maintained at the heated temperature for 4 hours (first heat treating), and then heated to 700° C. at a rate of 2° C./min for about 2 hours and 30 minutes under an atmosphere of nitrogen and then maintained at the heated temperature for about 6 hours (second heat treating).

However, as the first heat treating is performed under the atmosphere of oxygen, the positive electrode additive according to the present disclosure was not produced, and a lithium composite oxide in a layered phase which was generally used as a positive electrode active material was formed.

Comparative Example 5

26.7 g of $Li_2O$ as a lithium raw material, 66.5 g of NiO as a nickel raw material, and 6.8 g of aluminum phosphate as a raw material of an element M were mixed, heated to 200° C. at a heating rate of 2° C./min for about 1 hour and 30 minutes under an atmosphere of nitrogen and then maintained at the heated temperature for 4 hours (first heat treating), and then heated to 400° C. at a rate of 2° C./min for 1 hour and 30 minutes under an atmosphere of nitrogen and then maintained at the heated temperature for 6 hours (second heat treating).

However, it can be seen from an X-ray diffraction analysis result that a crystal structure was not formed due to a low temperature during the first heat treating, and a positive electrode additive was not produced and only unreacted $Li_2O$ is present (see Experimental Example 2).

Experimental Example 1: Reaction Temperature Analysis

For a mixture of $Li_2O$, NiO, and ammonium phosphate as an M source, a thermogravimetric analyzer (TGA) was used to analyze reaction temperatures of reaction materials in the mixture. For comparison, thermal analysis was performed on a $Li_2O$ material only and a mixture of $Li_2O$ and the M source, and the results were shown in FIG. 1.

As shown in FIG. 1, it can be seen from the TGA analysis that ammonium phosphate (M source) and $Li_2O$ first react at about 400° C. to form $Li_3PO_4$ as a Li-M-O phase, and the Li-M-O phase, the remaining $Li_2O$ and NiO were reacted at about 700° C. to form a P-doped $Li_2NiO_2$ phase. From the results, it can be seen that an amount of unreacted $Li_2O$ was reduced through multiple steps of heat treating at the temperature at which the reaction occurs.

Experimental Example 2: Positive Electrode Additive Analysis

A positive electrode is manufactured using a positive electrode additive or particles of the positive electrode active material prepared in Examples 1 to 3 and Comparative Examples 1 to 5, and after the positive electrode is charged to 3.8 V, X-ray diffraction analysis (XRD) is performed on the positive electrode.

Specifically, the positive electrode additive prepared in Examples 1 to 3 or in Comparative Examples 1 to 5, the carbon black conductive material, and the PVdF binder were mixed in a N-methylpyrrolidone solvent in a weight ratio of 85:10:5 to prepare a composition for forming the positive electrode (viscosity: 5000 mPa·s), and then each composition was coated to an aluminum current collector and then dried and rolled to manufacture the positive electrodes. A Li-metal was used as a negative electrode, and an electrolyte solution containing 1.15 M $LiPF_6$ with a mixing solvent containing ethylene carbonate (EC)/dimethyl carbonate (DMC)/ethyl methyl carbonate (EMC) (mixing volume ratio of EC:DMC:EMC=3:4:3) was used to manufacture a pouch type of battery.

Figure 2:
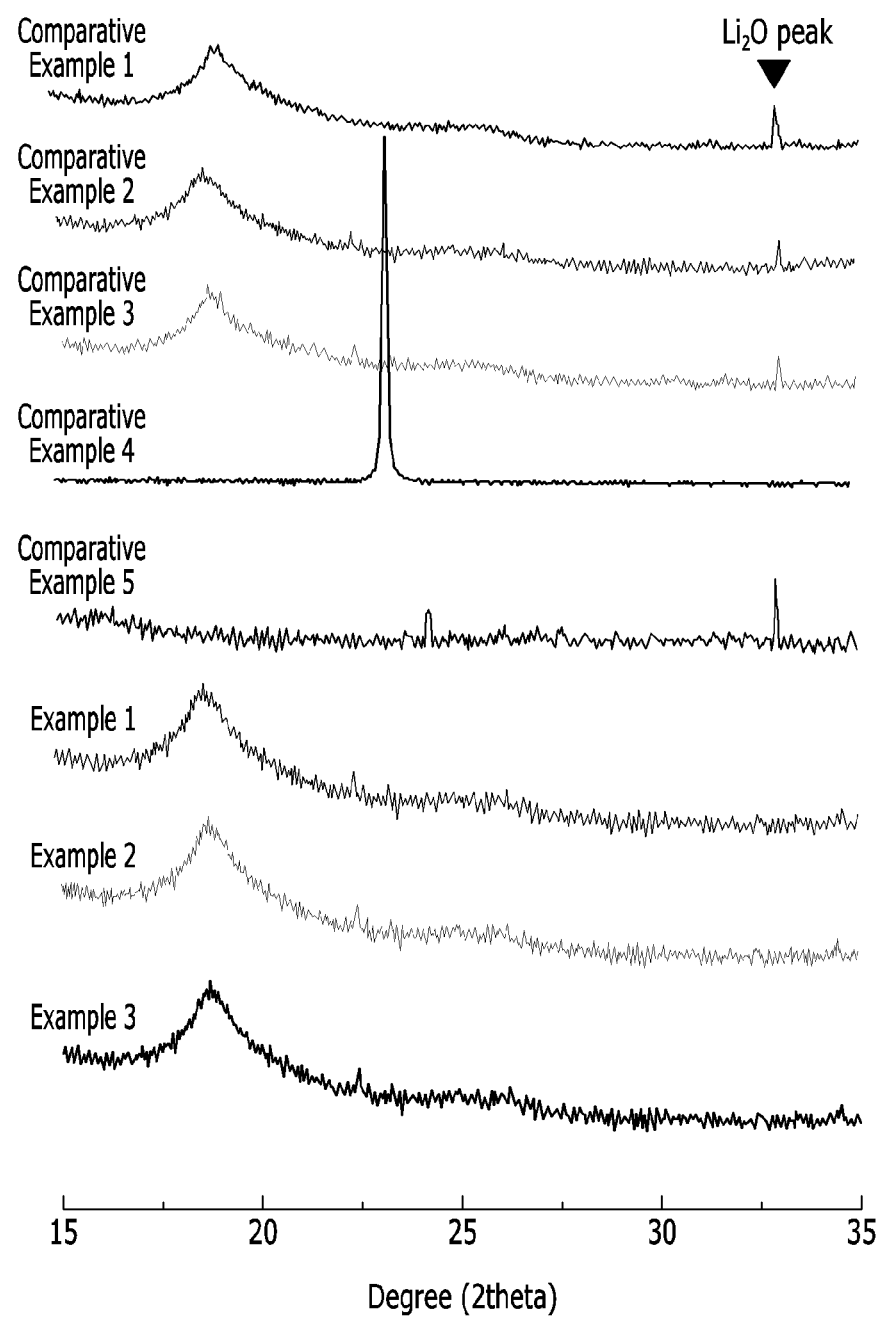
FIG. 2 is a graph showing a result of X-ray diffraction spectroscopy (XRD) for positive electrode additives according to Examples 1 to 3 and Comparative Examples 1 to 5.

The manufactured battery was charged at 0.1 C to 3.8 V at 25° C., and the positive electrode was separated and subjected to XRD analysis using D4-Endeavor™ (manufactured by Bruker AXS GmbH) using Cu-Kα radiation (2θ=15~35°, scanning speed=4°/min). The results are shown in FIG. 2.

The results show that as $Li_2NiO_2$ was converted into $LiNiO_2$ during charging, and only a $LiNiO_2$ peak was observed in the electrode containing the positive electrode additive of Examples 1 to 3. Accordingly, when intensity of the peak appearing at 2θ=30° to 35° was d1, and intensity of the peak at 2θ=15° to 20° was d2, d1/d2=0.

However, in Comparative Examples 1 to 3, in addition to the $LiNiO_2$ peak, a $Li_2O$ peak was observed. In Comparative Example 4, as the first heat treating was performed under an atmosphere of oxygen, a lithium composite oxide in a layered phase which was generally used as a positive electrode active material was formed. In Comparative Example 5, the positive electrode additive was not synthesized due to the low temperature during the first heat treatment, and only the unreacted $Li_2O$ was confirmed.

It can be seen that unreacted $Li_2O$ was reduced by multiple steps of heat treating under a controlled condition when preparing the positive electrode additive, as in the examples.

From the XRD result, the amounts of unreacted $Li_2O$, by-products, $Li_2NiO_2$, and a lithium oxide containing an element M in the positive electrode additive were quantitatively analyzed. The results were shown in Table 1 below.

TABLE 1

|  | a (Å) | B (Å) | C (Å) | $Li_2Ni_{0.94}P_{0.06}O_2$ (wt %) | NiO (wt %) | $Li_2O$ (wt %) |
|---|---|---|---|---|---|---|
| Comparative Example 1 | 3.7431 | 2.7791 | 9.0266 | 84.1 | 12 | 3.9 |
| Comparative Example 2 | 3.7435 | 2.7796 | 9.0272 | 87.2 | 11 | 1.8 |
| Comparative example 3 | 3.7438 | 2.7791 | 9.0276 | 86.8 | 10.9 | 2.3 |
| Comparative Example 4 | 2.872 | 2.872 | 14.23 | Layered phase formed | — | — |
| Comparative Example 5 | — | — | — | — | — | — |
| Example 1 | 3.7439 | 2.7793 | 9.0278 | 89.3 | 10.7 | 0 |
| Example 2 | 3.7439 | 2.7792 | 9.0278 | 89.2 | 10.8 | 0 |
| Example 3 | 3.7439 | 2.7793 | 9.0277 | 89.5 | 10.5 | 0 |

In Table 1, "—" means no measurement.

As shown in Table 1, in the positive electrode additives of Examples 1 to 3 prepared according to the present disclosure, the amount of NiO and the amount of $Li_2O$ are significantly reduced when compared with those of Comparative Examples 1 to 3.

Experimental Example 3: Evaluation of Positive Electrode Additive

Using the positive electrode additives prepared in Examples 1 to 3 or in Comparative Examples 1 to 3, a positive electrode was prepared as follows, and generation of gas is evaluated during charging and discharging of a battery.

Specifically, the positive electrode additive prepared in Examples 1 to 3 or in Comparative Examples 1 to 3, the carbon black conductive material, and the PVdF binder were mixed in a N-methylpyrrolidone solvent at a weight ratio of 85:10:5 (Viscosity: 5000 mPa·s) to prepare a composition for forming the positive electrode, and the composition is coated to an aluminum current collector and then dried and rolled to manufacture the positive electrode. Li-metal was used as a negative electrode, and an electrolyte containing 1.15 M of $LiPF_6$ with a solvent having a mixed volume ratio of EC:DMC:EMC=3:4:3 was used to manufacture a pouch type of battery.

Figure 3:
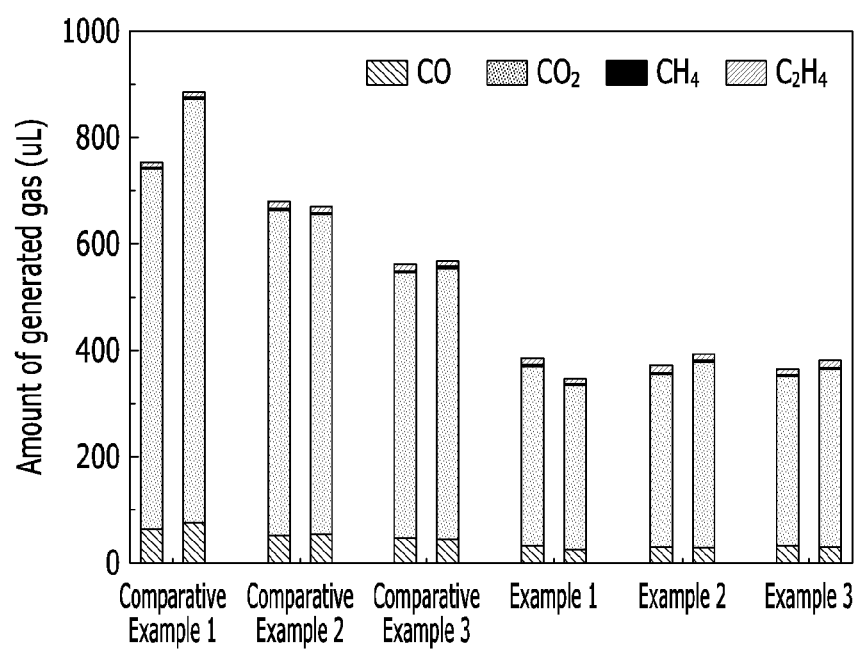
FIG. 3 is a graph showing an amount of gas generated when the battery including a positive electrode additive according to Examples 1 to 3 and Comparative Examples 1 to 3 is operated.

The manufactured battery was charged to 4.25 V at 0.1 C at 25° C., and gas collected into a pouch was analyzed by a gas chromatography-thermal conductivity detector (GC-TCD). The same experiment was repeated twice. The results are shown in FIG. 3 and Table 2. For reference, in Comparative Examples 4 and 5, a gas experiment was not performed because the desired positive electrode additive was not formed.

TABLE 2

| | | Comparative Example 1 | | Comparative Example 2 | | Comparative example 3 | | Example 1 | | Example 2 | | Example 3 | |
|---|---|---|---|---|---|---|---|---|---|---|---|---|---|
| | | $1^{st}$ | $2^{nd}$ | $1^{st}$ | $2^{nd}$ | $1^{st}$ | $2^{nd}$ | $1^{st}$ | $2^{nd}$ | $1^{st}$ | $2^{nd}$ | $1^{st}$ | $2^{nd}$ |
| Amount of gas (µl) | CO | 63.8 | 76.1 | 51.8 | 53.8 | 47.8 | 45.1 | 32.7 | 26.6 | 30.2 | 29.8 | 31.6 | 30.1 |
| | $CO_2$ | 677 | 797 | 612 | 602 | 499 | 508 | 336 | 305 | 325 | 348 | 320 | 335 |
| | $CH_4$ | 2.2 | 2.9 | 3.6 | 2.8 | 2.9 | 3.6 | 3.2 | 3.2 | 3 | 3.2 | 3 | 2.5 |
| | $C_2H_4$ | 10 | 11 | 12.6 | 12.4 | 12 | 11.5 | 12.5 | 12 | 13.1 | 11.8 | 10.2 | 13.2 |
| | Total | 753 | 887 | 680 | 671 | 561.7 | 568.2 | 384.4 | 346.8 | 371.3 | 392.8 | 364.8 | 380.8 |

From the experimental results, when the positive electrode additive of Examples 1 to 3 prepared according to the preparing method of the present disclosure is included, because the amount of by-products and unreacted materials contained in the positive electrode additive decreases, the amount of generated gas is significantly reduced when compared with Comparative Example 1 in which the heat treating is performed once when preparing the positive electrode additive, Comparative Example 2 in which the heat treating is performed twice but the duration of the first heat treating is too short, and Comparative Example 3 in which the duration of the first heat treating was too long, and in particular, was reduced by 50% or more when compared with Comparative Example 1.

The invention claimed is:

1. A method for preparing a positive electrode additive of a lithium secondary battery, comprising
mixing a lithium raw material, a nickel raw material, and a raw material of an element M, and heat treating them under an atmosphere of an inert gas to produce a lithium nickel oxide of Chemical Formula 1 below,
wherein the heat treating comprises first heat treating at 300° C. to 500° C., and second heat treating at 550° C. to 800° C. after the first heat treating, and the first heat treating is performed for 30% or more and less than 50of a total duration of the heat treating,
wherein the positive electrode additive comprises the lithium nickel oxide of Chemical Formula 1,
wherein the positive electrode additive further comprises less than 11 wt % NiO and 1 wt % or less $Li_2O$ based on a total weight of the positive electrode additive, wherein a total amount of the NiO and the $Li_2O$ is less than or equal to 11 wt % based on a total weight of the positive electrode additive, and,
after being charged at 0.1 C to 3.8 V at 25° C. and then being analyzed using X-ray diffraction, the positive electrode additive has a peak intensity ratio of d1/d2=0, when a peak intensity appearing at 2θ=30° to 35° is d1 and a peak intensity appearing at 2θ=15° to 20° is d2:

$$Li_2Ni_{1-x}M_xO_2$$ [Chemical Formula 1]

wherein, in Chemical Formula 1, M is a transition metal, an amphoteric element, P, F, or B, wherein M is not nickel, and 0<x<1.

2. The method of claim 1, wherein the first heat treating is performed for 35% to 45% of the total duration of the heat treating at 330° C. to 450° C.

3. The method of claim 1, wherein the first heat treating comprises a temperature rising step of heating to a temperature of 300° C. to 500° C. at a rate of 2° C./min to 7° C./min, and a maintaining step of maintaining the heated temperature for 40% to 80% of the total duration of the first heat treating.

4. The method of claim 1, wherein the second heat treating is performed at 600° C. to 800° C.

5. The method of claim 1, wherein the second heat treating comprises a temperature rising step of heating to a temperature of 550° C. to 800° C. at a rate of 2° C./min to 7° C./min and a maintaining step of maintaining the heated temperature for 60% to 90% of the total duration of the second heat treating.

6. The method of claim 1, wherein the lithium raw material is used in an amount such that a mole ratio of lithium:(nickel+element M) is 2:1 when mixing the lithium raw material, the nickel raw material, and the raw material of the element M.

7. The method of claim 1, wherein the lithium raw material comprises any one or a mixture of two or more selected from the group consisting of a lithium-containing oxide, a hydroxide, an oxyhydroxide, a sulfate, a nitrate, an acetate, a carbonate, an oxalate, a citrate, a halide, and hydrates thereof.

8. The method of claim 1, wherein the raw material of the element M comprises any one or a mixture of two or more selected from the group consisting of an oxide, a hydroxide, an oxyhydroxide, a sulfate, a nitrate, an acetate, a carbonate, an oxalate, a citrate, a halide, a phosphate, and hydrates thereof that contain the element M.

9. The method of claim 1, wherein the Ni raw material comprises NiO.

10. The method of claim 1, wherein the element M is selected from the group consisting of W, Ti, Zr, Al, P, F, and B.

11. A positive electrode additive for a lithium secondary battery, comprising a lithium nickel oxide of Chemical Formula 1, wherein the positive electrode additive further comprises less than 11 wt % NiO and 1 wt % or less $Li_2O$ based on the total weight of the positive electrode additive, wherein a total amount of the NiO and the $Li_2O$ is less than or equal to 11 wt % based on a total weight of the positive electrode additive, and after being charged at 0.1 C to 3.8 V at 25° C. and then being analyzed using X-ray diffraction, the positive electrode additive has a peak intensity ratio of d1/d2=0, when a peak intensity appearing at 2θ=30° to 35° is d1 and a peak intensity appearing at 2θ=15° to 20° is d2, and wherein the positive electrode additive is prepared by the method of claim 1:

$$Li_2Ni_{1-x}M_xO_2 \qquad \text{[Chemical Formula 1]}$$

wherein, in Chemical Formula 1, M is a transition metal, an amphoteric element, P, F, or B, wherein M is not nickel, and 0<x<1.

12. A positive electrode for a lithium secondary battery comprising the positive electrode additive of claim 11.

13. A lithium secondary battery comprising: a positive electrode comprising the positive electrode additive of claim 11; an electrolyte; and a negative electrode.

* * * * *